United States Patent [19]

Casey

[11] Patent Number: 4,911,008
[45] Date of Patent: Mar. 27, 1990

[54] HOT FILM ANEMOMETER

[75] Inventor: Gary L. Casey, Troy, Mich.

[73] Assignee: Allied-Signal Inc., Morris Township, Morris County, N.J.

[21] Appl. No.: 252,946

[22] Filed: Oct. 3, 1988

[51] Int. Cl.$^4$ ............................................. G01F 1/68
[52] U.S. Cl. .................................. 73/202.5; 73/204.21
[58] Field of Search ............ 73/202.5, 204.21, 204.22, 73/204.25, 204.26

[56] References Cited

U.S. PATENT DOCUMENTS

| | | | |
|---|---|---|---|
| 4,083,244 | 4/1978 | Agar et al. ....................... | 73/204.21 |
| 4,571,996 | 2/1986 | Wakeman et al. .................. | 73/202 |
| 4,637,251 | 1/1987 | Carp ................................ | 73/118.2 |

*Primary Examiner*—Herbert Goldstein

[57] ABSTRACT

An anemometer comprising: orifice plate adapted to be disposed within a flow stream, including an orifice; a thin film bridge, spaced from and disposed downstream of the orifice plate for directing the stream exiting the orifice in a direction perpendicular to the flow direction and for insulatingly suspending a plurality of resistive elements within a portion of the flow stream exiting the orifice. The plurality resistive elements comprising a first resistive element conformally shaped to the orifice, and a second resistive element substantially circumferentially disposed about the first resistive element, the second resistive element comprising a sense resistor having a resistance which changes with flow and a circuit formed in part by the plurality of resistive elements, forming a sensing network therewith for generating a signal indicative of the flow stream.

31 Claims, 2 Drawing Sheets

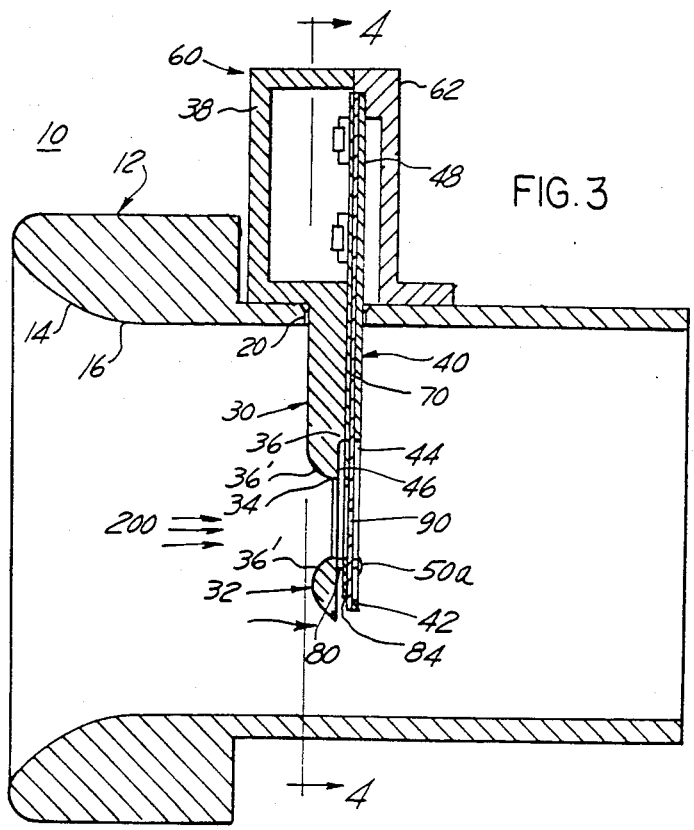
FIG. 3
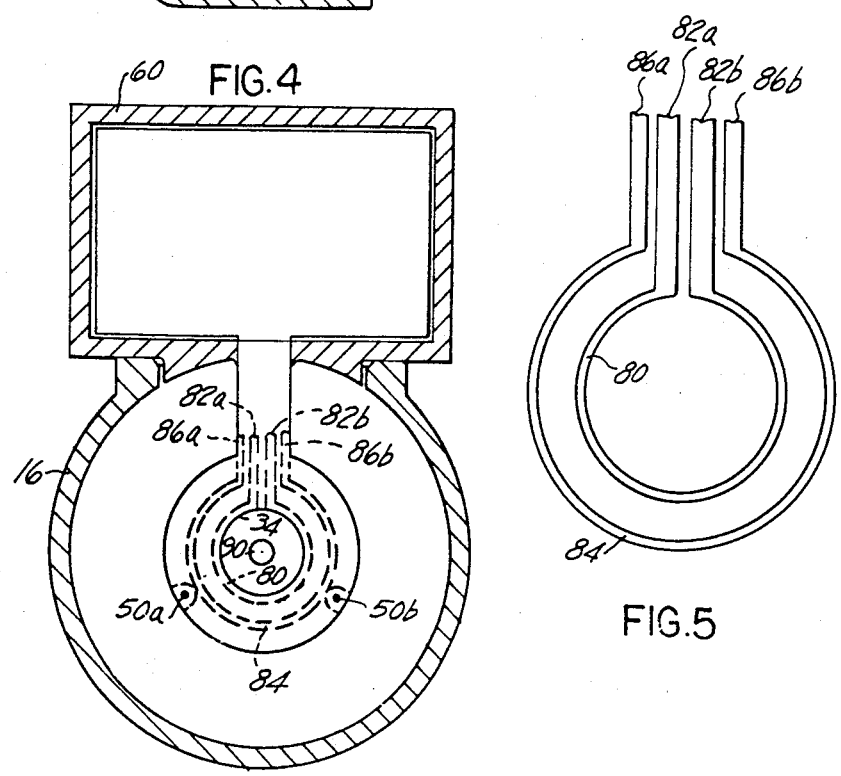
FIG. 4
FIG. 5

HOT FILM ANEMOMETER

BACKGROUND AND SUMMARY OF THE INVENTION

The present invention generally relates to anemometers and more particularly to a hot film anemometer.

The present invention is related to a hot wire anemometer which has previously been used to measure air flow, air turbulence and boundry layers. The principal behind a hot wire anemometer is that if an electrically heated fine wire is placed in a gas stream its resistance is altered by the air cooling of the wire the degree of wire cooling is proportional to fluid flow.

Anemometers of various types have been used to measure the mass of air flowing into an engine. FIG. 1 is illustrative of a prior art hot wire anemometer comprising a flow tube A and a resistance wire B positioned in a relatively rectangular orientation within the tube A. This approach has a number of deficiencies such as the resistance of the wire will vary as dust or other particulates in the inlet air stream become attached to the heated wires. These particulates may also form an insulative covering about the wire diminishing its sensitivity. As an example, the dust may contain silica which upon being heated by the resistance wire covers the wire with a glass-like coating. Other deficiencies of this type of anemometer are that its sensitivity to reverse air flow is very high. That is, this type of anemometer cannot distinguish between forward and reverse air flow. During certain instances a particular amount of air is caused to flow out of the engine, such as during a backfire, and again past the resistance wire. This type of anemometer would indicate that this reverse flow of air is, in fact, air flowing into the engine. This anemometer contains no mechanism for prohibiting the reverse airflow or for discriminating same. Also, if the wire spans a sufficiently large area it is not representative of the average flow through the tube A. FIG. 2 is illustrative of a different type of automotive hot wire anemometer. In order to increase its sensitivity (gain) to flow, the anemometer C contains a restriction or venturi D in the flow path. Situated about the venturi is an annulus E comprising a plurality of openings F which communicate with a measurement tube I into which are received two resistance elements H₁ and H₂. As the main flow of air moves though the inlet tube G a pressure differential is created which draws air through a measurement tub I. The inlet of the measurement tube can be oriented to receive ram air or otherwise. As previously mentioned, this type of anemometer exhibits a higher sensitivity to fluid flow and also a reduced sensitivity to reverse flow. A third type of anemometer, while not illustrated, includes a central tube into which is received flat plate oriented parallel to the flow of fluid. Situated on the surface of a large substrate are resistive thick film elements forming part of the anemometers' measurement circuit. One benefit of this anemometer is that it is less sensitive to particulates because of the flat parallel orientation. However, this type of device does not employ a venturi and as such its sensitivity (gain) is low and its response time is poor because of the relatively massive substrate. Further, this type of device cannot discriminate between forward and reverse air flow.

In general, conventional devices such as those described above use a relatively low velocity air stream exposed to a sense resistor. Therefor, a very low flow rates the flow becomes laminar upsetting the heat transfer from the heated resistor.

It is an object of the present invention to provide an anemometer which solves the deficiencies in the prior art. It is a further object of the present invention to provide an anemometer comprising a low resistive thermal mass capable of rapidly responding to flow variations. A further object of the invention is to provide an airflow sensor in which the air flow proximate a sensing element is turbulent.

Accordingly, the invention comprises: an anemometer comprising: an orifice plate adapted to be disposed within a flow stream, including an orifice; first means, spaced from and disposed downstream of the orifice plate for insulatingly suspending a plurality of resistive elements within a portion of the flow stream exiting the orifice; the plurality of resistive elements comprising a first (reference or cold) resistive element conformally shaped to the orifice, and a second resistive element substantially circumferentially disposed about the first resistive element. The second resistive element comprising a heated sense resistor having a heat transfer rate which changes with flow. The anemometer may further include second means, in circuit with the plurality of resistive elements, forming a sensing network therewith for generating a signal indicative of the flow stream.

Many other objects and purposes of the invention will be clear from the following detailed description of the drawings.

BRIEF DESCRIPTION OF THE DRAWINGS

In the drawings:

FIG. 3 illustrates a side cross-sectional view of the present invention.

FIG. 4 illustrated a cross-sectional view taken through section 4—4 of FIG. 3.

FIG. 5 illustrates an electrode or resistive element pattern.

DETAILED DESCRIPTION OF THE INVENTION

Figure 1:
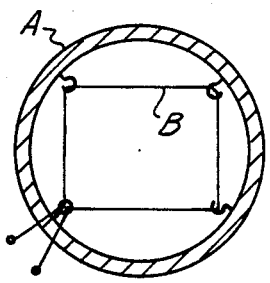
FIGS. 1 and 2 are illustrative of the prior art.
Figure 2:
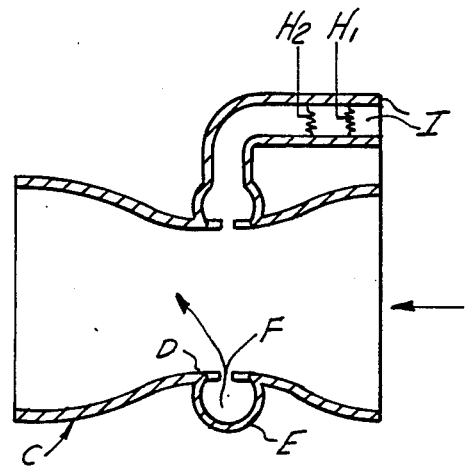

With reference to FIGS. 3–5, there is illustrated a hot film anemometer 10 comprising a housing 12 including a flow tube 16 having a inlet 14 and an outlet 18. The flow tube 16 further includes an opening 20. Cantilevered from the inlet tube and received through the opening 20 is a flow directing means comprising a first plate 32 connected to a first support member 30. In the preferred embodiment, as illustrated in FIG. 1, the first plate 32 and first support member are of integral cantilevered annular construction resembling the configuration of a "lollipop". The first support member is substantially rectangular in cross-section and the first plate comprises an annular flat plate 32. The first plate 32 includes an orifice 34 which may be of the sharp edged variety. The first plate 32 may be tapered, flat or otherwise configured in the vicinity of the orifice 34. As more particularly illustrated in FIG. 3, the first plate is suspended within the flow tube 16 so that its orifice 34 is generally concentric with the center line of the flow tube 16. Also cantilevered within the flow tube is a second support member 40 and a second plate 42. In the preferred embodiment of the invention the second support member and second plate are of integral construction. Further, the second support member may be flat shaped and of substantially the same dimension as the first support member. The second plate, which in the preferred embodiment is also of annular configuration has a diameter slightly less than the diameter of the first plate 32. The second support member further includes a second orifice 44 coaxial to but having a diameter larger than the diameter of the orifice 34. It is desirable that the second plate 42 be spaced from the first plate 32 to form therebetween substantially annular flow passage 46. This spacing is achieved by fabricating within the first support a back plate or spacer portion 36. Further, to enhance the structural rigidity of the combination of the first and second plate 32 and 34 respectively, fasteners such as fasteners 50a and 50b may be received through portions of the first plate and second plates. These fasteners also aid in maintaining the spacing of the plates.

The first support member includes a radially extending portion 38 positioned exterior to the tube 16 to form one part of an electrical circuit housing 60. Another portion of the electrical circuit housing is formed by a second housing member 62. It is preferable that the second housing portion 62 be fabricated of a metal having a high heat flow characteristic so as to function as a heat sink for electric components situated within the circuit housing 60. Further, as can be seen from FIG. 3, the second support 40 includes an extending portion 48 within the circuit housing and secured thereto. As will be discussed below, various electric components can be fastened to the extending portion 48. It is logical to fabricate the second support member 40 as well as the second plate 42 of a circuit board material of known variety.

Secured or disposed upon an upstream surface of the second support member 40 and second plate 42 (electric circuit board) is a thin layer of insulative material 70 (the thickness of which is exagerated). The thickness of the insulative material is approximately 0.051 to 0.127 mm. One such insulative material is a rugged, thin polymide film known as Kapton. Further, as can be seen from FIG. 3, the insulative coating forms a thin film bridge across the opening 44. Secured to the thin film of insulative material spanning the opening 44, are a plurality of resistive elements. About the opening is a first resistive element 80 having a substantially annular configuration comprising two leads or terminal 82a and b that extend upwardly into the circuit housing 60 for connection with additional circuit components as discussed below. A second resistive element 84 is circumferentially disposed about the first resistive element and similarly includes leads or terminals 86a and b which extend upwardly it to the circuit housing 60. The first resistive element 80, in the discussion below, is also referred to as a reference element (resistor) or cold resistor $R_c$, while the second resistive element 84 is also referred to as a sensing element (resistor) or heated resistor $R_h$. These resistive elements 80 and 84 ($R_c, R_h$) are characterized as having positive temperature coefficients of resistance (TCR). In the preferred embodiment of the invention, the elements 80 and 84 are fabricated of a metal such as platinum (or nickel) which may be deposited such as by a thick film or sputtering technique to the insulative layer 70.

In operation, power is supplied to the circuit 100 thereby energizing the resistive elements $R_c$ and $R_h$. As the engine is started, air flow is induced through the flow tube 16 by the action of the cylinders within the engine. The airflow flows circumferentially about the first and second plates 32 and 34. A portion of the airflow designated by arrows 200 enter through the orifice 34. By virtue of the flat edge of the orifice 34 the airflow direction abruptly changes and flows in a turbulent manner radially outwardly through the auxiliary flow path 46. It is preferable that the second resistive element 84 $R_h$ (sensing resistor) be positioned on the insulative film 70 such that it is in the path of this turbulent airflow. By virtue of the close spacing between the first and second plates 32 and 34, such spacing being in the range of 0.08 to 2.0 millimeters, the airflow within the auxiliary flow path 46 will essentially be turbulent for all operative values of airflow. Because all air flow is across sharp edged orifice, the flow pattern across the sense resistor is not effected by air viscosity, thereby providing accurate flow signals at very low flows and temperatures.

As the air passes across the exterior of the first and second plates, a pressure differential relative to the airflow in the orifice 34 is created thereby urging the air within the auxiliary flow path to flow radially outwardly and across the sensing resistor 84 ($R_h$). As the air flows across the sensing resistor 84 ($R_h$), its temperature is lowered, thereby causing a change in resistance of this resistive element 84 ($R_h$). As described below, the change in rate of heat resistance or transfer and its resistance is proportional to airflow. The change in resistance of resistor 84 cased by the cooling effect of the air flow, unbalances a bridge circuit and causes the circuit to increase current flow until the bridge returns to a balanced condition. The voltage required to maintain this balance can be used as an output signal.

The positioning of the first resistive element upstream of and spaced from the sensing resistive element 84 ($R_h$) yields various advantages. As an example, with the second disk smaller than the first, reverse air flow is inhibited from entering the passage 46. In addition, during operation the resistor 84 ($R_h$) is heated to a fixed temperature above resistor 80 ($R_c$) and it is not desirable to conductively heat the reference resistor 80 by the heat of the sensing resistor 84 ($R_h$). As can be seen, as the flow exits the orifice 34 and flows through passage 46 it passes by the reference resistor 80 and then flow across the sensing resistor 84, thereby carrying with it the heat from the sensing resistor 84. A further embodiment of the present invention is shown in FIG. 3 by the numeral 90. As the air exits the orifice 34, particulates carried by the air will impact the insulative strip 70. It may be desirable, but only as an option to the above-described invention, to fabricate within the insulative film 70 an opening 90 which operates as a particulate trap permitting particulates in the air stream to flow therethrough, thereby decreasing the possibility that the particulates may become lodged upon or abrade the resistive elements 80 and 82.

In FIG. 3 the first support member 30 is shown to be substantially thicker than the first plate 32. It should be appreciated that the thickness can be substantially reduced and the first support member can be relatively flat. FIG. 3, however, illustrates that the first support member may include a transition surface such as the accurate, annular surface 36' tapering inwardly towards the orifice 34 to function as a flow director to direct flow into the orifice 34 and increase the mechanical strength of the device. In additional, since this surface may also taper outwardly it will also divert flow around the first plate.

Figure 6:
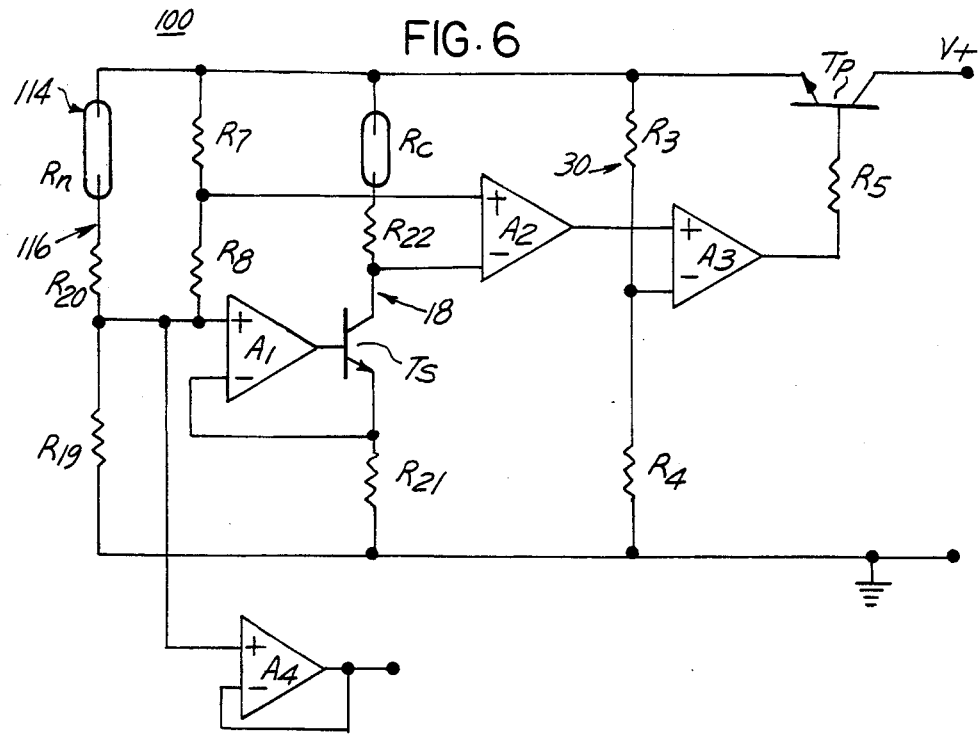
FIG. 6 illustrates an electrical circuit which may be used with the present invention.

Reference is made to FIG. 6 which illustrates an electric circuit 100 to be used with and which may optionally form part of the anemometer. The circuit 100 employs a current bridge which includes means for balancing the current flow in various legs of the bridge by selectively changing the resistance of a sensing element. A reference voltage source, V, is input to the circuit 100 at node 112, and communicated to the collector terminal of a power transistor $T_p$. The emitter of transistor $T_p$ is communicated to a sensing or hot resistor $R_h$, a compensation or cold resistor $R_c$, a voltage divider circuit comprising resistors $R_7$ and $R_8$ and to another voltage divider circuit comprising resistors $R_3$ and $R_4$. The circuit 100 comprises a resistive bridge generally illustrated as 114 comprising a sensing leg which includes the sense resistor $R_h$ and an offset resistor $R_{20}$ and a compensation leg comprising resistor $R_c$ and another offset resistor $R_{22}$. In the preferred embodiment of the invention, the resistors $R_h$ and $R_c$ are temperature variable resistors in which the magnitude of the respective resistances vary with temperature. Such resistors ($R_h$ and $R_c$) are preferably of a platinum or nickel variety having a temperature coefficient of resistance (TCR) of approximately 3,000–3,300 parts per million per degree centigrade (TCR of nickel 5,000–5,500 ppm/° C.). Ideally, the resistors $R_h$ and $R_c$ are chosen to have identical temperature coefficients of resistance (TCR) and the identical resistance at ambient or room temperature. In the sensing or heated leg 116 of the bridge circuit 114 is the series combination of resistors $R_h$ and $R_{20}$. Resistor $R_{19}$ is in series with $R_h$ and $R_{20}$. One terminal of $R_{19}$ is connected to ground. The common terminal between resistors $R_{20}$ and $R_{19}$ is connected to the positive input of an amplifier designated as $A_1$. The first voltage divider 128 comprising the series resistance combination of $R_7$ and $R_8$ is connected across the emitter terminal of the power transistor $T_p$ to the positive input of amplifier $A_1$. The output of amplifier $A_1$ is connected to the base of a transistor $T_s$ which is located in series with the compensation or cold leg 118 of the bridge circuit 114. The collector terminal of the transistor $T_s$, and a terminal of $R_{22}$ are communicated to the negative input of an amplifier $A_2$. The positive input of amplifier $A_2$ is connected to the common junction between resistors $R_7$ and $R_8$. The emitter terminal of transistor $T_s$ is communicated to the negative input terminal of amplifier $A_1$ and to ground potential through resistor $R_{21}$. The voltage appearing at the positive input terminal of amplifier $A_1$ comprises the controlled output voltage of the present invention which may be communicated to a voltage following amplifier $A_4$ as shown. The output of amplifier $A_2$ is connected to the positive terminal of an optional amplifier $A_3$, the negative input of which is communicated to the positive terminal between the second voltage divider 130 comprising resistors $R_3$ and $R_4$. The output of amplifier $A_3$ may be communicated via resistor $R_5$ to the base of the power transistor $T_p$. The circuit illustrated in FIG. 6 will operate adequately without amplifier $A_3$ by driving the power transistor $T_p$ directly or through a bias resistor $R_5$ from the output of amplifier $A_2$.

In operation the circuit 100 maintains the temperature of the sensing or hot resistor $R_h$ (84) a predetermined level above the temperature of the compensation or cold resistor $R_c$ (80). In the preferred embodiment this temperature differential is approximately 80° C. for all air flow conditions.

During ambient conditions, the circuit, if powered, will operate to generate the above desired temperature differential between $R_h$ and $R_c$. While it is desirable to have the sensing resistor $R_h$ and compensation resistor $R_c$ identical (in magnitude and having the same thermal temperature coefficient of resistance, TCR) in practice this is most often not practical.

Resistors $R_{20}$ and $R_{22}$ provide an off-set control function to move the initial temperature differential up or down, as the case may be, to generate the desired temperature differential. The trimming of the resistors is performed during initial manufacture. Typically this adjustment is done by trimming resistors $R_{20}$ and $R_{22}$. If the initial temperature differential is too small, $R_{20}$ is lowered ($R_{22}$ increased). If the temperature differential is too great $R_{22}$ is lowered increased).

The circuit includes a second feature which is useful in compensating for differences in the respective TCR's of $R_h$ and $R_c$. The ratio of $R_7/R_8$ controls the temperature shift of $R_h$ for a given temperature shift in $R_c$ such that for all ambient temperature changes $R_h$ will track the changes in $R_c$. This compensation is called a gain G compensation or adjustment.

The following equations illustrate the relationship between the sensing resistor $R_h$, the compensation resistor $R_c$, the gain adjustment G and the temperature offset OS:

$$R_h = \frac{R_{19}}{R_{21}} \times \frac{R_7 + R_8}{R_7} \times (R_c + R_{22}) - R_{20} \qquad (1)$$

$$G = \frac{R_{19}}{R_{21}} \times \frac{R_7 + R_8}{R_7} \qquad (2)$$

$$R_h = G \times (R_c + R_{22}) - R_{20} \qquad (3)$$

$$R_h = G \times R_c + (G \times R_{22} - R_{20}) \qquad (4)$$

$$OS = G \times R_{22} - R_{20} \qquad (5)$$

$$R_h = G \times R_c + OS \qquad (6)$$

As can be seen in the circuit of FIG. 6 the gain G adjustment is a multiplier to $R_c$ compensating for a non-equal TCR relationship. The off-set OS is shown as an effective resistance bias value which yields an equivalent operating temperature differential (i.e. 80° C.).

In operation, the bridge circuit 114 will be balanced when $R_h + R_{20} = R_c + R_{22}$. Assuming that the TCR of resistor $R_c$ is approximately 3000 ppm/°C. to achieve the desired 80° C. temperature differential $R_h + R_{20}$ should be 2.4 ohms less than $R_c + R_{20}$ at room temperature. When the circuit is initially activated $R_h + R_{20}$ is less than $R_c + R_{22}$. In this case the bridge 14 is unbalanced. By the connection of $R_{19}$ and $R_{21}$ to the unity gain amplifier $A_1$, the transistor $T_s$ will not turn on until amplifier $A_1$ generates a positive output.

In the circuit of FIG. 6 the ratios of $R_{19}$ to $R_{21}$ are approximately 1/7 (approximately 14 ohms and 100 ohms). As such, in an equilibrium condition the current ($I_{21}$) through resistor $R_{21}$ is about one-seventh the current ($I_{19}$) through resistor $R_{19}$ (i.e. $I_{21} = 1/7 \times I_{19}$). In addition the current flow in the compensationor cold leg 118 and the sensing or hot leg 116 of bridge 114 are in the same ratio (i.e. 1:7). In air unbalanced condition the power transistor will heat resistor $R_h$ until $R_h + R_{20} = R_c + R_{22}$. If $R_h$ and $R_c$ are initially equal at room temperature (i.e. about 10 ohms) the bridge 114 will become balanced when $R_h$ is heated to approximately 12.4 ohms. At this point the voltage across the voltage divider $R_7 + R_8$ is equal to the voltage across $R_h + R_{20}$. The voltage across $R_7$ is equal to the voltage across $R_c + R_{22}$ and the output of amplifier $A_2$ will decrease and reduce the current delivered by the power transistor $T_p$. $R_7$ and $R_8$ may be chosen to be approximately equal to $R_{19}$ and $R_{21}$ respectively.

As air flows across the sense resistor $R_h$ it will be cooled, lowering its resistance. In this situation the output of amplifier $A_2$ goes high driving amplifier $A_3$ causing more current to flow through $T_p$ into the sense resistor $R_h$ heating it to bring it back to its nominal value of approximately 12.4 ohms and so maintains the desired temperature differential.

Similarly, if the air flow is such that $R_h$ is running too hot the positive voltage to amplifier $A_2$ is less than the voltage supplied to its negative terminal. As such the output of amplifier $A_2$ will go low causing less current to be supplied from the power transistor $T_p$. As $R_h$ cools its resistance decreases and brings the voltage across $R_7$ back to a value to balance the voltage across $R_c + R_{22}$.

Many changes and modifications in the above described embodiment of the invention can, of course, be carried out without departing from the scope thereof. Accordingly, that scope is intended to be limited only by the scope of the appended claims.

I claim:

1. An anemometer comprising:
    a housing including a flow tube having an inlet and an outlet;
    a first support member, extending into the flow tube;
    a first plate positioned within the flow tube extending from and supported by the first support member, including an orifice therethrough;
    a second support member extending into the flow tube;
    a second plate including an opening, supported by the second support member positioned downstream and space therefrom, of substantially the same size as the first plate, and forming an auxiliary flow path therebetween;
    an insulative layer received upon an upstream surface of the second plate and across the opening;
    a first resistive element, disposed on an upstream portion of the insulative layer, coaxial to the orifice and spanning the opening;
    a second resistive element, disposed on the insulative layer spanning the opening and aerodynamically downstream of the first resistive element and positioned radially outward from the first resistive element.

2. The anemometer as defined in claim 1 wherein the orifice is circular and wherein the first resistive element is substantially annular.

3. The anemometer as defined in claim 2 wherein the second resistive element is substantially annular and disposed about the first resistive element.

4. The anemometer as defined in claim 3 including terminal means in circuit with portions of the first and second resistive elements for supplying electric signals thereto.

5. The anemometer as defined in claim 3 wherein first and second resistive elements are one of platinum or nickel.

6. The anemometer as defined in claim 1 wherein the first plate is flat and wherein the orifice includes flat edges.

7. The anemometer as defined in claim 6 wherein an upstream surface of the first plate includes an accurate surface positioned about and tapering towards the orifice.

8. The anemometer as defined in claim 1 wherein the second plate is flat and of smaller diametrical dimension than the first plate.

9. The anemometer as defined in claim 8 wherein edges of the second plate are flat.

10. The anemometer as defined in claim 1 wherein a portion of the first support member exterior to the flow tube defines a first part of a circuit housing and wherein the circuit housing includes a second portion which in cooperation with the first portion receives an extending portion of the second support member.

11. The anemometer as defined in claim 10 wherein the second support member and second plate are of integral construction.

12. The anemometer as defined in claim 11 wherein the second support member and second plate are fabricated of an electric circuit board.

13. The anemometer as defined in claim 12 wherein a portion of the electric circuit board within the electronic circuit housing supports addition circuit elements forming in cooperation with the first and second resistive elements a resistive bridge circuit.

14. The anemometer as defined in claim 13 wherein the second portion is fabricated of a metal.

15. The anemometer as defined in claim 1 wherein the insulative layer comprises a thin polymide film.

16. The anemometer as defined in claim 15 wherein the film is fabricated of Kapton.

17. The anemometer as defined in claim 15 wherein the insulative layer includes particulate trap means for diverting particulates in an air stream from the first and second resistive elements.

18. The anemometer as defined in claim 17 wherein the particulate trap means includes an opening therethrough.

19. The anemometer as defined in claim 1 further flow directing means for channeling a portion of the flow stream into the orifice.

20. An anemometer comprising:
    orifice plate adapted to be disposed within a flow stream, including an orifice;
    first means, spaced from and disposed downstream of the orifice plate for insulatingly suspending a plurality of resistive elements within a portion of the flow stream exiting the orifice and for forming a flow path, substantially perpendicular to the air flow;
    the plurality resistive elements comprising a first resistive element conformally shaped to the orifice, and a second resistive element substantially circumferentially disposed about the first resistive element, the second resistive element comprising a sense resistor having a resistance which changes with flow.

21. The anemometer as defined in claim 20 including second means, in circuit with the plurality of resistive elements, forming a sensing network therewith for generating a signal indicative of the flow stream.

22. The anemometer as defined in claim 21 wherein the portions of the sensing network are disposed within a circuit housing exterior to the flow tube and wherein at least a portion of the circuit housing includes heat sink means for dissipating heat energy generated by the sensing network.

23. The anemometer as defined in claim 20 wherein the first means comprises third means for forming a thin insulative bridge.

24. The anemometer as defined in claim 23 wherein the insulative bridge comprises an annular support and a thin insulative film secured thereacross.

25. The anemometer as defined in claim 24 wherein the orifice plate is disposed perpendicular to the flow stream.

26. The anemometer as defined in claim 24 wherein the insulative bridge comprises particulate trap means for diverting particulates in the flow stream from the resistive elements.

27. The anemometer as defined in claim 24 wherein the annular support is diametrally smaller than the orifice plate.

28. The anemometer as defined in claim 20 wherein the orifice plate is flat and wherein the orifice include a sharp edge.

29. The anemometer as defined in claim 20 wherein the orifice and first means cooperate to induce turbulent air flow within the space therebetween.

30. The anemometer as defined in claim 29 wherein the second resistive element is located on the first means to receive the turbulent flow.

31. The anemometer as defined in claim 30 wherein the first resistive element is situated upstream and spaced from the second resistive element.

* * * * *